United States Patent

Majkrzak et al.

[11] Patent Number: 5,881,096
[45] Date of Patent: Mar. 9, 1999

[54] METHOD FOR REMOVING BIAS IN A FREQUENCY HOPPING DIGITAL COMMUNICATION SYSTEM

[75] Inventors: Bryan S. Majkrzak, Clifton, N.J.; John Bertrand, Upper Nyack; Marvin A. Epstein, Monsey, both of N.Y.; Gary V. Blois, Towaco; Joseph M. Fine, West Caldwell, both of N.J.

[73] Assignee: ITT Manufacturing Enterprises, Inc., Wilmington, Del.

[21] Appl. No.: 869,583

[22] Filed: Jun. 5, 1997

[51] Int. Cl.[6] .............................. H04B 15/00; H04K 1/00; H04L 27/30
[52] U.S. Cl. .................... 375/202; 375/209; 375/319; 375/260
[58] Field of Search ................................ 375/202, 200, 375/208, 209, 210, 343, 345, 319, 260

[56] References Cited

U.S. PATENT DOCUMENTS

| | | | |
|---|---|---|---|
| 4,665,404 | 5/1987 | Christy et al. | 375/202 |
| 5,029,182 | 7/1991 | Cai et al. | 375/208 |
| 5,195,108 | 3/1993 | Baum et al. | 375/343 |
| 5,422,889 | 6/1995 | Sevevhans et al. | 375/319 |
| 5,430,759 | 7/1995 | Yokev et al. | 375/202 |
| 5,579,338 | 11/1996 | Kojima | 375/343 |
| 5,583,517 | 12/1996 | Yokev et al. | 375/200 |
| 5,734,639 | 3/1998 | Bustamante et al. | 375/208 |

*Primary Examiner*—Chi H. Pham
*Assistant Examiner*—Emmanuel Bayard
*Attorney, Agent, or Firm*—Plevy & Associates

[57] ABSTRACT

There is disclosed in a frequency hopping digital communications system having a transmitter for transmitting a data signal via a noisy transmission path, and a receiver responsive to the transmitted signal for receiving the same, a method for removing bias in the data signal at the receiver comprising the steps of: forming a sample amplitude histogram from the received data signal samples for a given hop frequency; correlating the amplitude histogram against a stored reference amplitude histogram to obtain a correlated output signal having a peak correlation position; determining the position difference between the peak correlation position and the correlation center position to provide an offset signal corresponding to the difference and indicative of an estimated bias offset value; and applying the estimated bias offset value to the received signal samples in response to the offset signal to obtain an output signal indicative of an unbiased received data signal.

20 Claims, 7 Drawing Sheets

| | |
|---|---|
| SC & FH (PT/CT) | Standard Data Modes (SDM) 600/1200/2400/4800/9600/16000 BPS rates |
| SC & FH (PT/CT) | Enhanced Data Modes (EDM) 1200/2400/4800/9600 BPS and packet |
| SC-PT | Analog FM voice |
| SC/FH-CT | CVSD 16 KBPS voice |
| SC & FH (PT/CT) | Radio re-transmit (all voice, SDM/EDM data rates and mixed modes) |
| SC & FH (PT/CT) | Remote Radio (2 wire) Both SINCGARS Radio Control Unit (SRCU) and RT (all voice and SDM/EDM and packet data rates) |
| SC (PT/CT) | Voice Scan |
| GPS Situation Awareness (SA) ||
| Packet switching networking with CSMA protocol ||
| Homing ||

Radio Modes

Fig. 1A

METHOD FOR REMOVING BIAS IN A FREQUENCY HOPPING DIGITAL COMMUNICATION SYSTEM

CROSS- REFERENCE TO RELATED APPLICATIONS

The present application is related to copending commonly assigned patent applications, Ser. No. 08/857,990, filed on May 16, 1997 by Bertrand, et al., entitled "Radio Architecture for an Advanced Digital Radio in a Digital Communication System", and Ser. No. 08/850,231, filed on May 2, 1997 by Epstein, et al., entitled "Frequency Hopping Synchronization and Tracking in a Digital Communication System" both being hereby incorporated herein by reference.

FIELD OF THE INVENTION

The invention relates to digital communications systems, and more particularly, to a method and apparatus for estimating and removing bias in a frequency hopping digital communications system.

BACKGROUND OF THE INVENTION

The purpose of a digital communication system is to effectively transmit and receive information over a particular channel or communication medium. To that end, the performance of any communication system is ultimately determined (and often limited) by its ability to respond to the presence of noise in the system. Digital radios often have many modes for communicating with one another, and many methods of suppressing or limiting noise within a network, such as frequency hopping, bit and frame synchronization, and numerous modulation/demodulation and filtering techniques. The Single Channel Ground-Airborne Radio System (SINGCARS) digital radio is an example of a type of radio which employs these various modes and methods of communication. In frequency hopping signal transmission systems, a wideband signal is generated by hopping from one frequency to another over a large number of frequency choices. The frequencies used are chosen by a code similar to those used in direct sequence systems. For general background on spread spectrum systems, reference is made to a text entitled *Spread Spectrum Systems*, 2nd edition, by Robert C. Dixon and published by Wiley-Interscience, New York (1984).

One of the most significant impairments to frequency hopping digital radio receiver operation is bias. Bias compensation is necessary since some hops can have such a large positive bias that almost all active samples can be positive. In addition, some hops can be biased in a manner wherein almost all samples in the hop could be negative. The ideal received waveform has an eye pattern, where every "0" is positive and every "1" is negative. The eye pattern is symmetrical about the x axis so that the opening in the eye pattern, at bit sampling time, has equal margin for zeros and ones. A systematic bias occurs when some disturbance in a radio, such as those caused by hardware transients during frequency transitions, causes a constant to be added to every sample in a hop. If this constant is positive, then this reduces the margin of the negative values and may cause errors even in the absence of noise; if this constant is negative, it reduces the margin on the positive values. This represents a major problem for almost any communication system, but is particularly troublesome for military applications and emergency situations, where constant communication and informational updates are vital to mission success. Therefore, providing a method for bias compensation is desirable not only for improving bit decisions but also for enhancing system timing and enabling transmitter/receiver synchronization, since these processes are dependent upon timely and accurate detection of a signal in the presence of noise.

However, trying to estimate the systematic bias can result in the detection of a data dependent bias caused by a variation in the number of zeros relative to the number of ones in a hop which is unrelated to the true center of the eye pattern. It is then when the estimated bias is removed, which is affected by the data pattern, that systematic bias may be introduced rather than mitigated. Consequently, an improved method for estimating and removing bias that is relatively insensitive to data pattern variations, robust in noise, and operable in a frequency hopping digital communication system is greatly desired.

SUMMARY OF THE INVENTION

It is an object of the present invention to provide an improved method for estimating and removing bias in a frequency hopping digital communications system having a transmitter for transmitting a data signal via a noisy transmission path, and a receiver responsive to the transmitted signal for receiving the same. This method for removing bias in the data signal at the receiver comprises the steps of: controlling the gain of the received data signal samples by scaling the received samples; forming a sample amplitude histogram from the received data signal samples for a given hop frequency, the histogram having peak values at particular bin positions. The amplitude histogram is then correlated against a stored reference amplitude histogram having peak positions to obtain a correlated output signal having a peak correlation position. The position difference between the peak correlation position and the correlation center position is then determined to provide an offset signal corresponding to the difference and indicative of an estimated bias offset value. The estimated bias offset value is then applied to the received signal samples in response to the offset signal to obtain an output signal indicative of an unbiased received data signal.

Another aspect of the present invention comprises the step of performing a parabolic fitting responsive to the peak correlation position and to the adjacent positions of the correlated output signal peak position and to the position difference to provide the offset signal indicative of the estimated bias offset value to within a fraction of a bin width.

A further aspect of the present invention comprises the steps of scaling the received data signal samples for the current hop frequency to a target amplitude using a current scaling estimate, estimating the amplitude of the scaled received data signal samples, determining the difference between the estimated amplitude and said target amplitude and updating the scaling estimate in response to the difference for use in the next hop frequency to control the gain of the received data signal samples.

Still a further aspect of the present invention comprises the steps of collecting the received frequency hop data signal samples, determining the amplitude of each sample, calculating a bin number associated with the amplitude of each sample, and incrementing an associated bin counter responsive to the bin number calculation to form the sample amplitude histogram.

BRIEF DESCRIPTION OF THE DRAWINGS

The invention is to be explained in more detail below based on an embodiment, depicted in the following figures where:

FIG. 1A is an exemplary diagram illustrating the various modes of operation of the radio transmitter/receiver;

DETAILED DESCRIPTION OF THE INVENTION

The present invention is directed to a bias estimation and compensation method which has application in almost any frequency hopping mobile radio device where bit synchronization and bit decisions are required to receive a transmitted data signal. This bias removal method is especially useful in its application to a frequency hopping radio system such as the Single Channel Ground-Airborne Radio System (SINGCARS) Combat Net Radio (CNR), since a CNR employing the bias estimation and removal process of the present invention provides increased fidelity in making bit decisions on active samples of a given hop while decreasing acquisition time required for bit synchronization. Bit synchronization is improved because it is based on zero volt-crossover histogram positions which in turn, are generated as a result of those bit decisions. Accordingly, the bias removal process of the present invention will be described in its application to a CNR.

Figure 1:
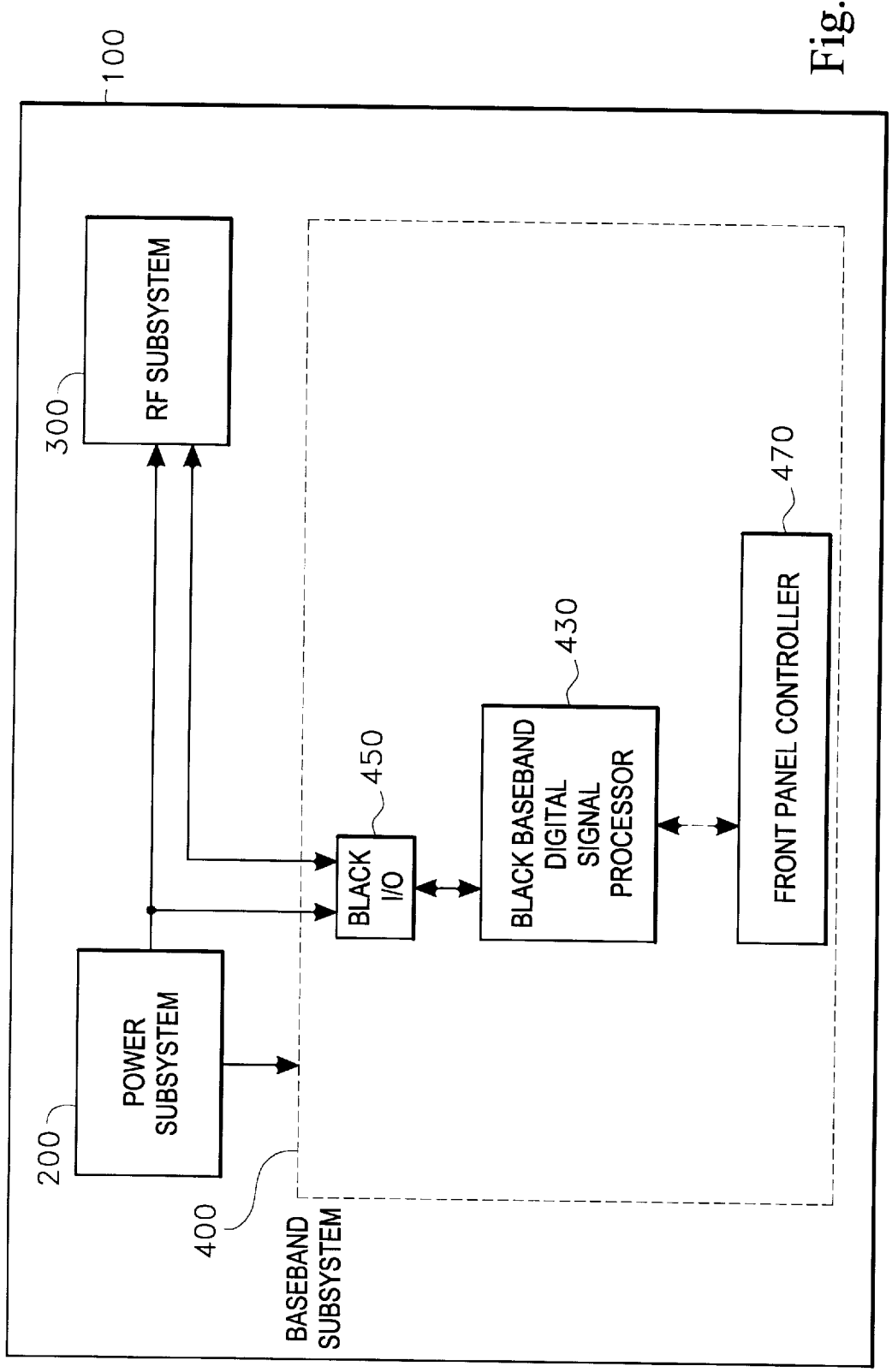
FIG. 1 is an exemplary diagram of the radio architecture of a radio transmitter/receiver wherein the present invention resides.

Referring to FIG. 1, a functional block diagram of a radio employing the bias removal process of the present invention is denoted by reference numeral 100. In a preferred embodiment, the radio 100 is operable in a variety of modes including a frequency hopping (FH) mode for transceiving voice and/or packet data at a variety of bit rates, as shown in FIG. 1A. Radio 100 is conventionally configured in terms of hardware and thus comprises a power subsystem 200, an RF subsystem 300 and a baseband subsystem 400. Power subsystem 200 develops all voltages required by the baseband 400 and RF 300 subsystems. Baseband subsystem 400 includes a front panel controller 470 and of particular interest to the present invention, computing devices including a black baseband digital signal processor (BBP) 430 and black I/O circuitry 450. BBP 430 performs the primary radio functions of radio 100 including waveform processing, frame and bit synchronization, and frequency hop (FH) generation. Black I/O circuitry 450 operates in a transmit mode to receive data samples from BBP 430 and prepares the data for transmission to the RF subsystem. Of particular importance to the present invention, black I/O circuitry 450 operates in a receive mode to receive data from RF 300, digitize the data via A/D converters and send samples to BBP 430 for demodulation and processing. Black I/O circuitry 450 thus provides the interface between the digital radio baseband portion 400 and the RF portion 300 of radio 100. BBP 430 also communicates control information to RF subsystem 300 through black I/O 450 to control and tune RF 300. It is well known in the art that radio 100 can be provided in a manpack configuration that also allows radio 100 to be mounted in a vehicle such as a jeep or tank, in a hand-held configuration that allows radio 100 to be hand-held, or in an airborne configuration that allows the radio 100 to be mounted in an airplane.

Figure 2:
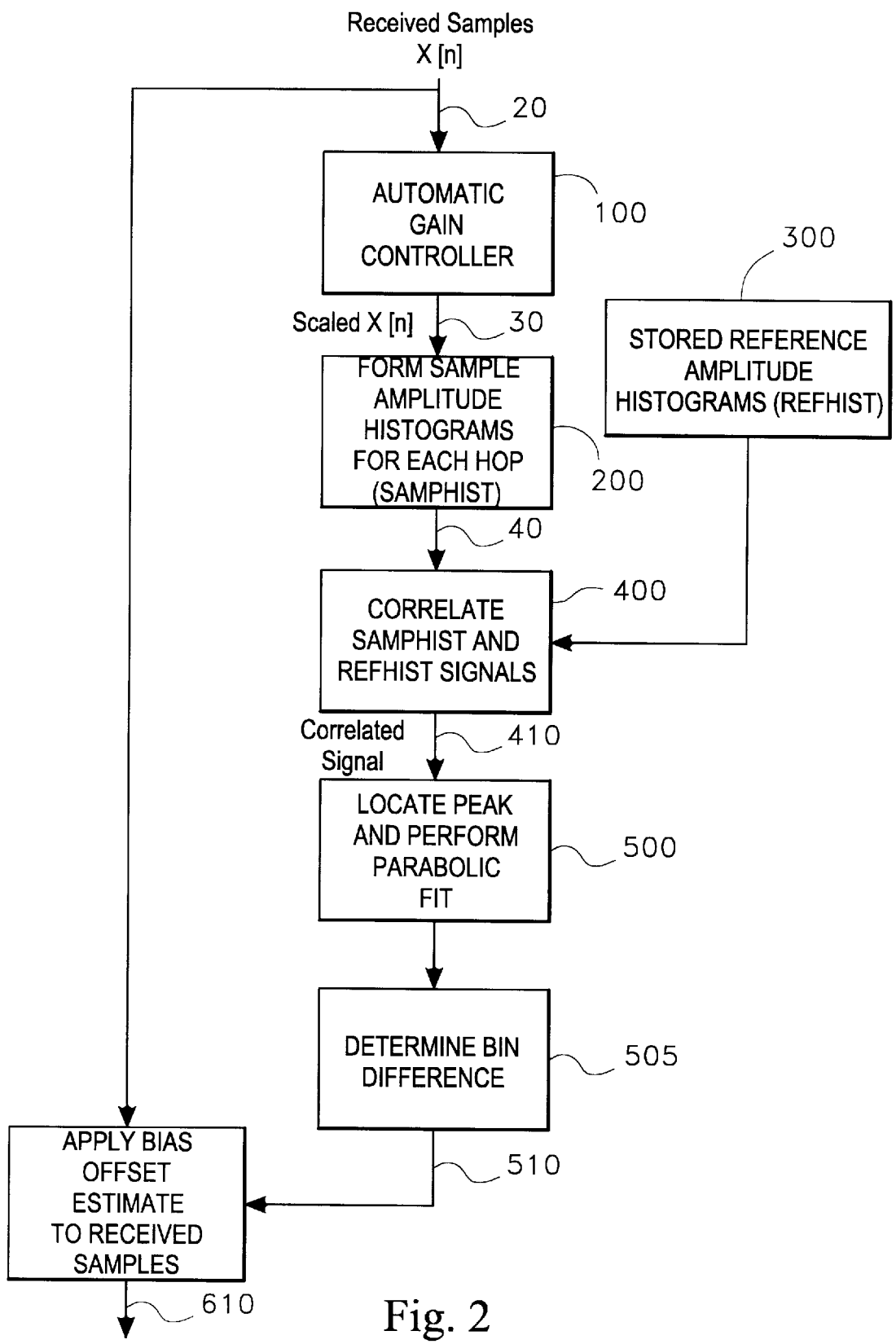
FIG. 2 is a flowchart of the bias estimation and removal process.
Figure 3:
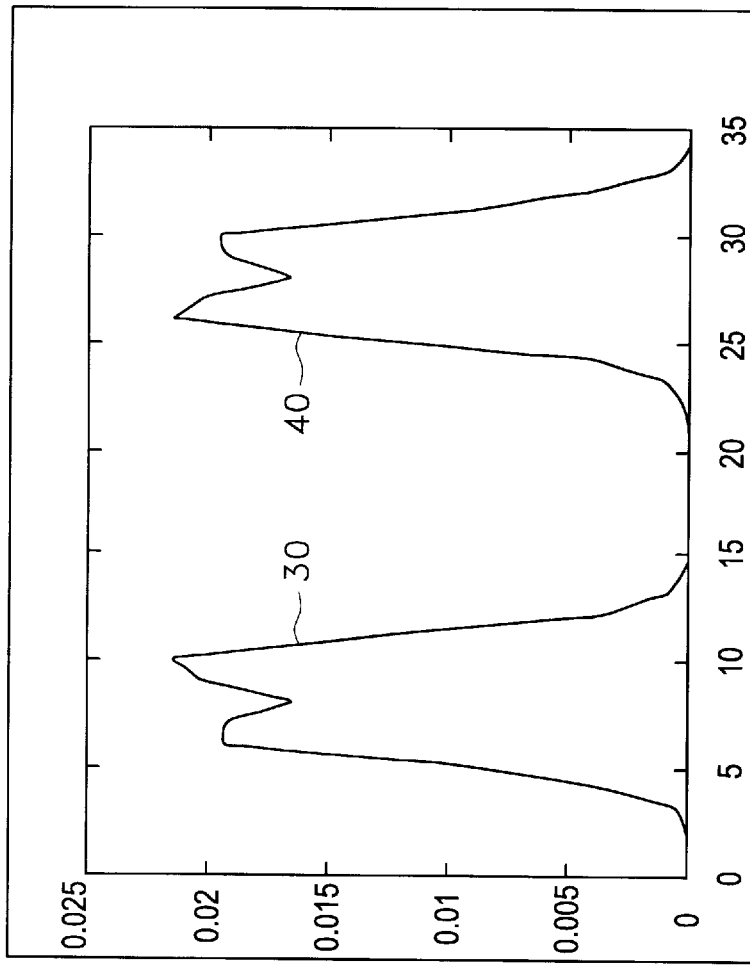
FIG. 3 is an exemplary diagram of a reference amplitude histogram.
Figure 4:
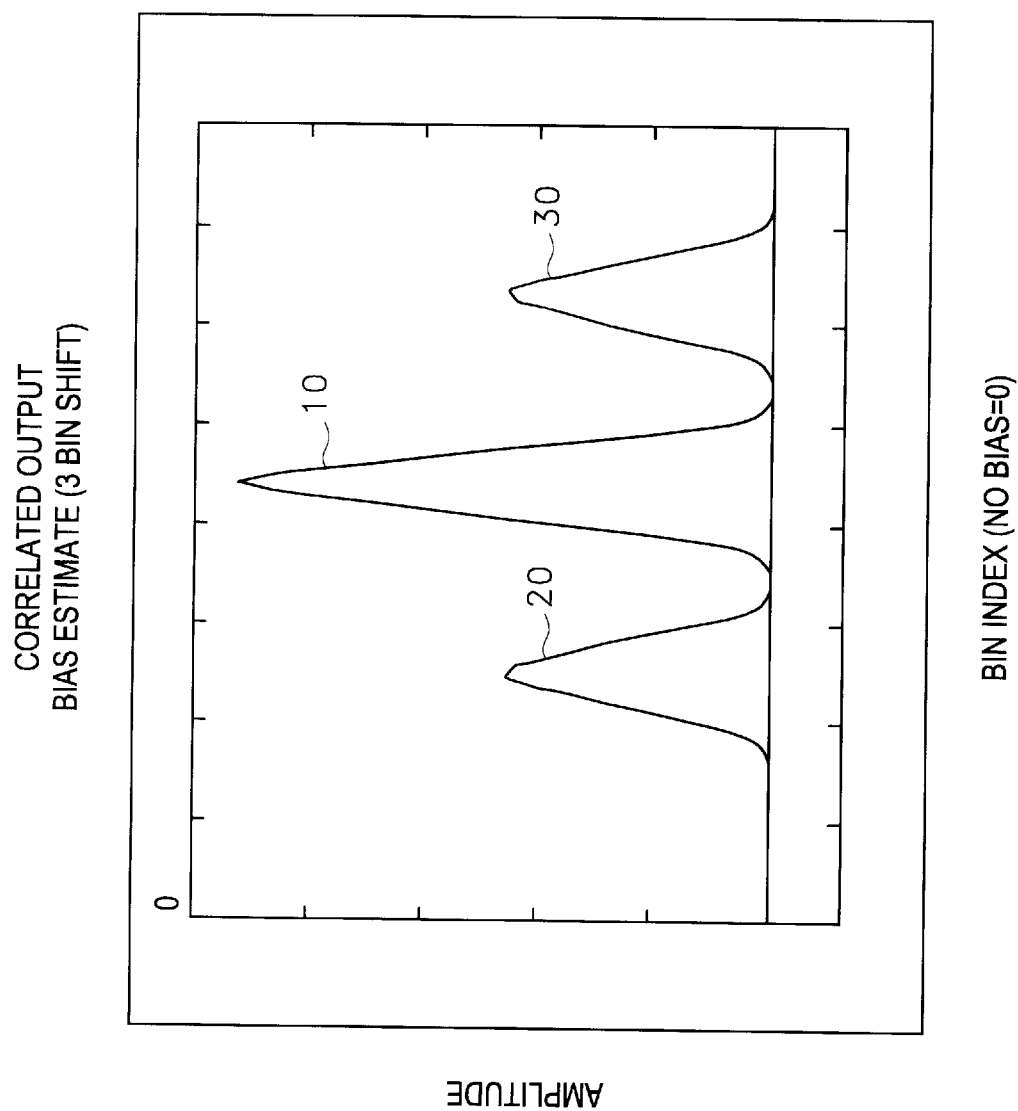
FIG. 4 is an exemplary diagram illustrative of a bias estimate resulting from the correlation of a reference amplitude histogram and sample amplitude histogram.

Referring now to FIG. 2, a flowchart depicting an embodiment of the present invention is shown. The inventive bias estimation and removal (BR) process is initiated when the radio is conditioned in the FH Receive mode of operation to search for and receive a transmitter signal. In the preferred embodiment, signal 20 corresponding to demodulated RF signal samples from black I/O circuitry 450 is received by automatic gain control (AGC) block 100 which controls the amplitude of the received signal samples. Scaled signal 30 indicative of the received signal 20 output from block 100 is then input to block 200 in order to form a sample amplitude histogram 40 based on the received scaled signal samples. Sample amplitude histograms are then constructed for each hop in order to derive a measurement of the bias inherent in the sampled signal. The sample amplitude histograms include a positive probability hump indicating positive values for the positive bits, and a negative probability hump for negative values, due to the negative bits. Sample amplitude histograms are constructed by collecting frequency hop data bit samples in block 200, determining the amplitude of each sample, calculating a bin number associated with the relative amplitude of the sample, and incrementing the associated bin counter to form the histogram. In the preferred embodiment, the samples are 16 bit integers with a range of values from −32768 to +32767. There are 128 bins in the sample amplitude histogram and the bin selection is made by using the sign bit of the sample and the 6 most significant bits. Each bin in the histogram represents 512 contiguous sample values, with the most negative bin representing the values from −32768 to −32257, the next bin representing the values from −32256 to −31745 and the most positive bin representing the from +32256 to +32767. The sample amplitude histogram (SAMPHIST) output from block 200 is then correlated against a stored reference amplitude histogram (REFHIST) (block 300) as shown in block 400 to produce a correlated output signal 410. The stored reference histogram 300 is indicative of an ideal sample amplitude histogram of a clean received signal at sample hop time. Theoretically, this histogram has zero probability near the nominal center (because there is a minimum magnitude for the sample values of an ideal waveform) and has two probability humps: a hump for positive values (reference numeral 30), due to the positive value bits, and a symmetrical hump for negative values (reference numeral 40), due to the negative bits, as illustrated in FIG. 3. Beyond the peak values, the histogram is zero since there is a maximum magnitude for a clean signal. The bias estimate concept is to form a sample amplitude histogram for each hop and then correlate this sample histogram against the ideal amplitude histogram. If the received signal is ideal, then the correlation will have a maximum at the center value corresponding to zero bias. If there is a bias B, then the position of the peak will be offset by the value B so that the estimated bias is just the offset of the peak correlation value. As can be seen, if one correlates a two humped signal such as shown in FIG. 3 against a similar two humped histogram, the results are three correlation peaks, a large peak 10 where both humps match up, and two smaller peaks 20 and 30, on each side of the central large peak, corresponding to matching up on only one peak. FIG. 4 illustrates the results of such a correlation. The bias estimate is thus the position of the larger central correlation peak 30.

While the reference histogram (REFHIST) is intended to simulate an ideal sample amplitude histogram, in practice such an ideal waveform is not totally achieved. The reference amplitude histogram is generated by accumulating a series of sample amplitude histograms for each frequency hop. These sample amplitude histograms are not perfectly aligned as there exists residual bias. Thus, the sample bins for each of the sample amplitude histograms are correlated against each other and shifted so as to further align them. Next, all of the sample amplitude histograms accumulated are averaged together to obtain an optimum estimate of the average. Finally, the distribution is made symmetrical by averaging the positive and negative sides. As shown in FIG. 4, the final amplitude distribution has positive and negative humps with five zeros in the center. The notch in the positive and negative distributions results from different amplitudes for different receive bit sequences (e.g., 011 vs 001). In the preferred embodiment, the reference amplitude histogram has 33 bins or taps. This filter thus represents an average distribution over multiple hops in a high signal to noise ratio environment. The following lists the taps of this symmetric filter, with tap 17 as the center tap.

TABLE 1

Histogram Filter Tap Weights

| TAPS 1:7 | TAPS 8:14 | TAPS 15:19 | TAPS 20:26 | TAPS 27:33 |
|---|---|---|---|---|
| 0.00009 | 0.01972 | 0.0 | 0.00006 | 0.01600 |
| 0.00053 | 0.02105 | 0.0 | 0.00012 | 0.01885 |
| 0.00353 | 0.01262 | 0.0(CTR) | 0.00081 | 0.01900 |
| 0.00896 | 0.00366 | 0.0 | 0.00366 | 0.00896 |
| 0.01900 | 0.00081 | 0.0 | 0.01262 | 0.00353 |
| 0.01885 | 0.00012 |  | 0.02105 | 0.00053 |
| 0.01600 | 0.00006 |  | 0.01972 | 0.00009 |

The chosen correlation technique with sample amplitude histograms, is fairly robust against noise. The Average Peak to Peak estimate, AVPTP, can be corrupted by one noise pulse at a peak sample value by the full value of the noise pulse. The sample amplitude histogram correlation technique averages all the positions, so that if there are N bits in a hop, a single nois e pulse only causes an effect of 1/N of its full value. Also, the sample amplitude histogram bias estimate is insensitive to data patterns. If a given hop has more zeros than ones, this merely changes the relative size of the sample histogram humps, which therefore change the size of the side correlation humps but do not change the size or position of the central hump which determines the estimated bias.

Referring back to FIG. 2, the inventive bias removal procedure has a number of steps. The first step is to scale the received signal samples to an appropriate amplitude. Then a sample amplitude histogram is formed from the scaled samples, as described above. Next, the reference histogram is correlated with the sample histogram and the peak correlation position is located. The selection of amplitude histograms with 128 bins is a tradeoff between computation load and precision. The number of bins is small enough to make the computation load reasonable and the resolution is good enough to distinctly locate the approximate peak location. However, as shown in FIG. 2, greater fidelity may be achieved for bias removal by performing a parabolic fitting procedure on correlated signal 410. Therefore, once the peak position is located on correlated signal 410, a parabolic fit identified in block 500 is performed on the peak and adjacent values of the cross-correlation to locate the bias to within a fraction of the bin width. The process of parabolic fitting is well known in the art. The parabolic peak position is then used to determine the bias offset value. The bin difference between the parabolic peak position and the reference histogram peak position is determined and thus the estimated bias offset value as shown in block 505 and output as signal 510. The bias offset value indicated in signal 510 is then applied to the received signal sample sequence at module 600 in order to remove the systematic bias from the received signals and produce an estimated unbiased signal 610 for performing bit synchronization and bit decision processing. As can be seen from the above description, the inventive bias estimate and removal process uses both a correlation at the bin spacing and a parabolic fit to obtain the desired accuracy. FIG. 4 shows a cross-correlation of the symmetric REFHIST filter with a shifted or biased version of itself. In this figure, the amplitude histogram was shifted by exactly 3 bins. Note that the location of the peak depends primarily on the shape (i.e. variance or separation) of the amplitude distribution and not on the height of the 'ones' or 'zeros' pile. Hence, this correlation process is relatively insensitive to data variations.

Figure 3A:
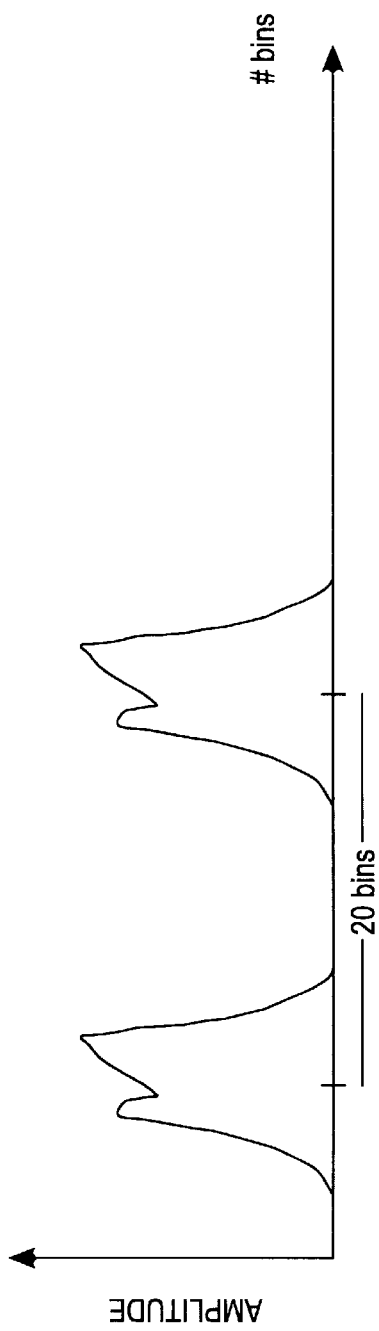
FIG. 3A–B is an exemplary diagram of a reference amplitude histogram and sample amplitude histogram having different gain characteristics.
Figure 3B:
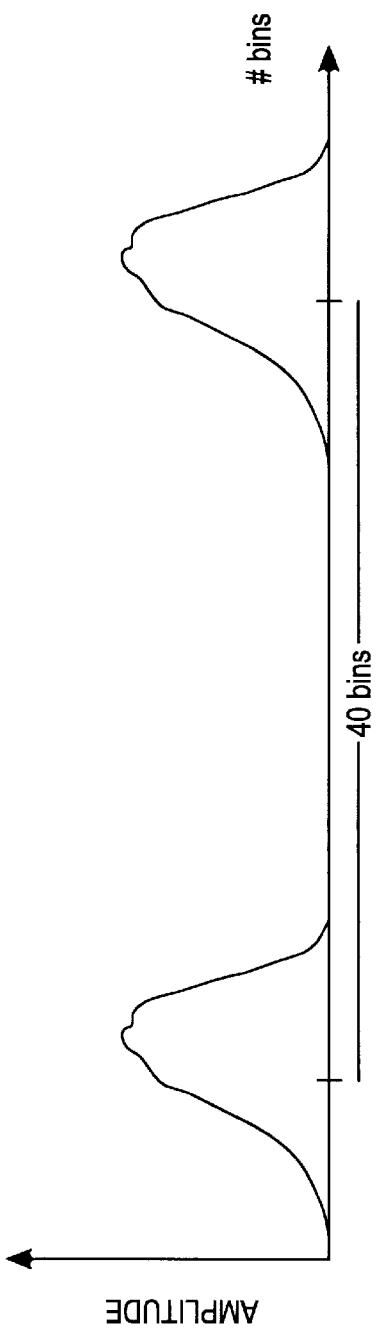

As described above, AGC block 100 controls the amplitude of the received signal samples 20 into the bias removal process. This is necessary since the techniques for forming and correlating the amplitude histograms with the reference histogram as described above, although not data pattern sensitive, are gain sensitive (even in the no noise case). This results from the dependence on the hump separation in the REFHIST (reference histogram) matching the hump separation in the sample amplitude histogram (SAMPHIST) at the correct bias offset, thus creating a large central correlation peak. Referring again to FIG. 2, if the received signal 30 for forming the sample amplitude histogram has a different gain than the REFHIST, then the spacing between the humps on the sample histogram will be different than the spacing between the humps on REFHIST, as shown in FIGS. 3A–B. This spacing difference can perturb the central correlation peak or even split the central peak into two peaks, thus causing problems for bias removal. AGC block 100 alleviates this problem by scaling the data samples to enable the spacing between the humps on the sample amplitude histogram to match the hump spacing for REFHIST. For an FM radio, the gain control problem is not a dynamic problem from hop to hop as radio gain variations are essentially in the analog baseband gain hardware of each radio, which are the same from hop to hop. The problem occurs on each transmission burst where a new set of radio transmitters and receivers are paired together, requiring the receiver radio to compensate for the gain differential between the gain of the last radio transmitter, to which it listened, and the gain of the current radio transmitter to which it is now listening.

The following procedure is used by AGC module 100 on each hop in order to control and adjust the scaled signal 30 for bias removal processing:

1. Scale the input data for the current hop to a target amplitude using the current scaling estimate.

2. Estimate the amplitude of the current scaled hop data.

3. Determine the difference between the estimated amplitude and the target amplitude.

4. Update the scaling estimate (for the next hop) using the difference calculated in step 3.

In a preferred embodiment, an average magnitude (AVGMAG) amplitude estimator is used to measure the amplitude of the scaled signal data after step 1 while being relatively insensitive to the noise level. The AVMAG estimate is formed by first taking the magnitude of the scaled signal samples for a hop from step 1 and then finding the average of the magnitudes.

In an alternative embodiment, the AVMAG estimate may be formed by first taking the magnitude of the scaled signal samples from step 1 and then finding the mean of the magnitudes.

In another alternative embodiment, a root mean square (RMS) estimator is used to measure the amplitude of the scaled signal data after step 1. The RMS estimate is formed by first taking the squares of the scaled signal samples for a hop, finding the mean of the squares termed MS, and then taking the square root of MS (i.e. the square root of the mean of the squares) to provide an estimate which is defined as the RMS.

Figure 5:
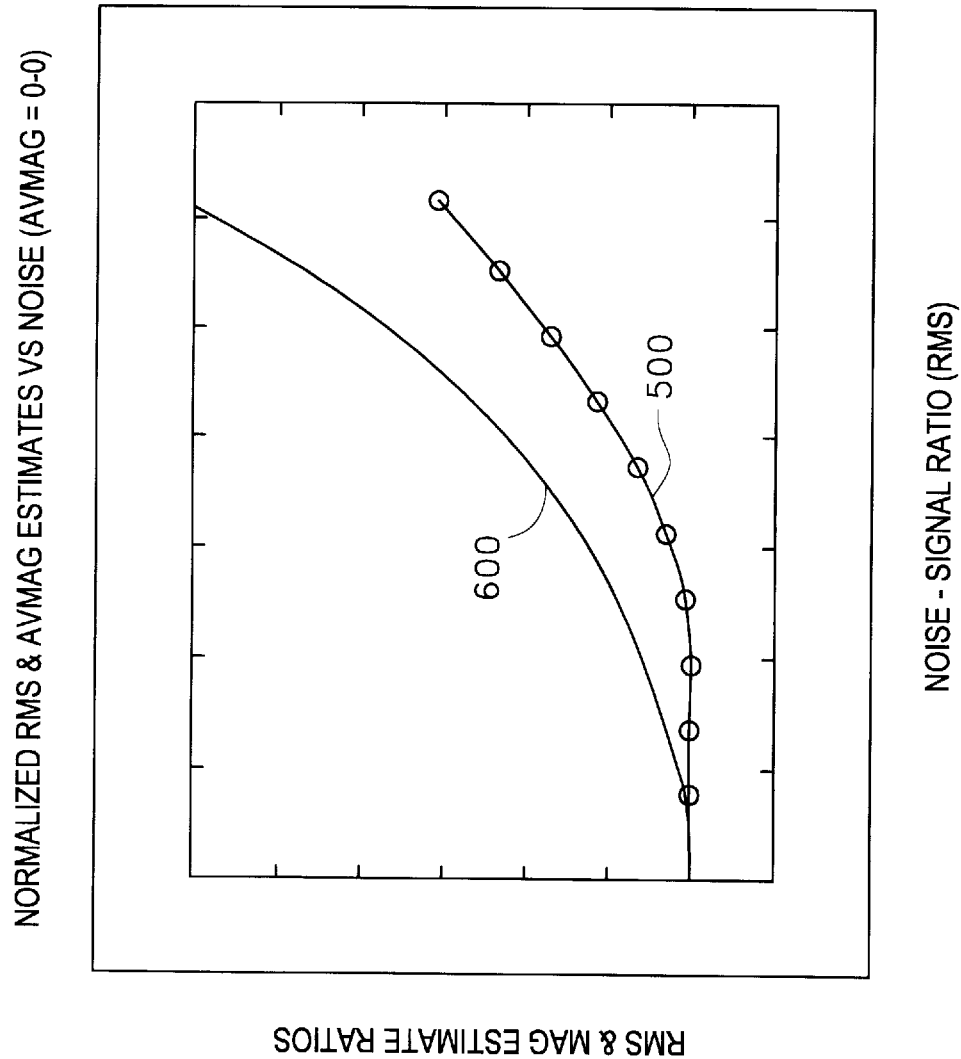
FIG. 5 is an exemplary diagram of RMS and AVGMAG gain control estimates in the presence of Gaussian noise.

Testing has revealed the AVMAG estimator is less affected by the noise which causes the sample values to change sign. FIG. 5 shows the results of varying the standard deviation of the Gaussian distribution (i.e. adding noise), calculating the resulting Noise to Signal Ratio, the RMS amplitude estimate and the AVMAG amplitude estimate. In FIG. 5, the RMS and the AVMAG amplitude estimates are presented after being normalized relative to their values at infinite SNR ratios (or equivalently at zero noise to signal ratios). FIG. 5 clearly shows the relative advantage of the AVMAG estimate 500 vs the RMS estimate 600 in noise. The AVMAG estimate 500 is the lower curve which means that it is closer to the value for just the desired signal with no noise. Note the AVMAG estimate remains essentially flat until the noise standard deviation increases to about half the signal standard deviation. This is due to the zero taps in the center of the symmetric amplitude histogram.

In the preferred embodiment, the bias estimation and removal process is implemented in software within the baseband digital signal processor. While there has been shown and described the preferred embodiments of the invention, other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. In a frequency hopping digital communications system having a transmitter for transmitting a data signal via a noisy transmission path, and a receiver responsive to said transmitted signal for receiving the same, a method for removing bias in said data signal at said receiver comprising the steps of:

forming a sample amplitude histogram from said received data signal samples for a given hop frequency;

correlating said amplitude histogram against a stored reference amplitude histogram to obtain a correlated output signal having a peak correlation position;

determining the position difference between said peak correlation position and a correlation center position to provide an offset signal corresponding to said difference and indicative of an estimated bias offset value;

applying said estimated bias offset value to said received signal samples in response to said offset signal to obtain an output signal indicative of an unbiased received data signal.

2. The method according to claim 1, further including the step of:

performing a parabolic fitting responsive to said peak correlation position and to adjacent position of correlated output signal peak position and to said position difference to provide said offset signal indicative of said estimated bias offset value to within a fraction of a bin width, wherein said step is performed before the step of applying said estimated bias offset value to said received signal samples and after the step of determining said position difference.

3. The method according to claim 1, further including the step of controlling a gain of said received data signal samples prior to the step of forming said sample amplitude histogram to minimize perturbations and spreading in said correlated output signal.

4. The method according to claim 3, wherein the step of controlling the gain of said received data signal samples includes the steps of:

scaling said received data signal samples for the current hop frequency to a target amplitude using a current scaling estimate;

estimating the amplitude of said scaled received data signal samples;

determining the difference between said estimated amplitude and said target amplitude;

updating said scaling estimate in response to said difference for use in a next hop frequency.

5. The method according to claim 4, wherein the step of estimating the amplitude further comprises:

determining the magnitude of said scaled signal samples; and averaging said magnitudes to provide an output signal indicative of said estimated amplitude.

6. The method according to claim 4, wherein the step of estimating the amplitude further comprises:

providing a root mean square value of said scaled signal samples indicative of said estimated amplitude.

7. The method according to claim 1, wherein the step of forming said sample amplitude histogram comprises the steps of:

collecting said received frequency hop data signal samples;

determining the amplitude of each sample;

calculating a bin number associated with said amplitude of each said sample;

incrementing an associated bin counter responsive to said bin number calculation.

8. The method according to claim 1, wherein said reference histogram is formed by:

accumulating sample amplitude histograms for each said hop frequency;

correlating said sample amplitude histograms and averaging said correlated output histograms to produce an averaged histogram distribution having positive and negative portions;

averaging said positive and negative portions of said averaged histogram distribution to produce a symmetrical distribution of said reference histogram.

9. The method according to claim 1, wherein said sample amplitude histogram includes 128 bins.

10. The method according to claim 1, wherein said reference histogram includes 33 bins.

11. In a frequency hopping digital communications system having a transmitter for transmitting a data signal via a noisy transmission path, and a receiver responsive to said transmitted signal for receiving the same, an apparatus for removing bias in said data signal at said receiver comprising:

amplitude means for forming a sample amplitude histogram from said received data signal samples for a given hop frequency;

reference means for forming a reference amplitude histogram indicative of an ideal sample amplitude histogram;

correlation means responsive to said amplitude means and to said reference means for correlating said amplitude histogram against said reference amplitude histogram to obtain a correlated output signal having a peak correlation position;

means for determining the position difference between said peak correlation position and a correlation center position to provide an offset signal corresponding to said difference and indicative of an estimated bias offset value;

application means responsive to said offset signal for applying said estimated bias offset value to said received signal samples to obtain an output signal indicative of an unbiased transmitted data signal.

12. The apparatus of claim 11, further including:

parabolic means responsive to said correlated output signal and to said position difference for performing a parabolic fitting of said peak correlation position and adjacent positions of said correlated output signal peak position to provide said offset signal indicative of said estimated bias offset value to within a fraction of a bin width to said application means.

13. The apparatus of claim 11, further including:

gain control means responsive to said received data signal samples for controlling the amplitude of said received data signal samples for input to said amplitude means.

14. The apparatus of claim 13, wherein said gain control means includes:

scaling means for scaling said received data signal samples for the current hop frequency to a target amplitude using a current scaling estimate;

estimation means for estimating the amplitude of said scaled received data signal samples;

comparison means responsive to said scaling means and said estimation means for determining the difference between said estimated amplitude and said target amplitude;

update means for updating said scaling estimate in response to said difference for use in a next hop frequency.

15. The apparatus of claim 14, wherein said estimation means further comprises:

an average magnitude estimator, wherein the magnitude of said scaled signal samples are averaged to provide an output signal indicative of said estimated amplitude.

16. The apparatus of claim 14, wherein said estimation means further comprises:

a root mean square estimator, wherein the root mean square value of said scaled signal samples are obtained to provide an output signal indicative of said estimated amplitude.

17. The apparatus of claim 11, wherein said amplitude means further comprises:

means for collecting said received frequency hop data signal samples;

means for determining the amplitude of each sample;

means for calculating a bin number associated with said amplitude of each said sample;

means for incrementing an associated bin counter responsive to said bin number calculation.

18. The apparatus of claim 11, wherein said reference means includes:

means for accumulating sample amplitude histograms for each said hop frequency;

means for correlating said sample amplitude histograms and averaging said correlated output histograms to produce an averaged histogram distribution having positive and negative portions;

means for averaging said positive and negative portions of said averaged histogram distribution to produce a symmetrical distribution of said reference histogram.

19. The apparatus of claim 11, wherein said sample amplitude histogram includes 128 bins.

20. The apparatus of claim 11, wherein said reference histogram includes 33 bins.

* * * * *